US009191807B2

United States Patent
Jang et al.

(10) Patent No.: US 9,191,807 B2
(45) Date of Patent: Nov. 17, 2015

(54) PROVIDING AN INDICATOR OF PRESENCE OF A FIRST ACCESS NETWORK THAT IS CAPABLE OF INTERWORKING WITH A SECOND ACCESS NETWORK

(71) Applicant: Apple Inc., Cupertino, CA (US)

(72) Inventors: Ke-Chi Jang, Plano, TX (US); Eric Parsons, Stittsville (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/318,045

(22) Filed: Jun. 27, 2014

(65) Prior Publication Data

US 2014/0308944 A1    Oct. 16, 2014

Related U.S. Application Data

(63) Continuation of application No. 13/321,764, filed as application No. PCT/US2010/037875 on Jun. 9, 2010, now Pat. No. 8,798,624.

(60) Provisional application No. 61/185,811, filed on Jun. 10, 2009.

(51) Int. Cl.
*H04W 8/22* (2009.01)
*H04W 48/18* (2009.01)
*H04W 48/10* (2009.01)
*H04W 88/06* (2009.01)

(52) U.S. Cl.
CPC ............... *H04W 8/22* (2013.01); *H04W 48/10* (2013.01); *H04W 48/18* (2013.01); *H04W 88/06* (2013.01)

(58) Field of Classification Search
CPC ..... H04W 48/16; H04W 48/18; H04W 88/06; H04W 92/02; H04W 48/08; H04W 88/14; H04W 48/20; H04W 4/02; H04W 60/005; H04W 84/04; H04W 84/12; H04W 92/24; H04W 36/0022; H04W 36/12; H04W 36/14
See application file for complete search history.

(56) References Cited

U.S. PATENT DOCUMENTS 6,795,437 B1    9/2004    Rasanen et al.
6,996,079 B1    2/2006    Bergenwall et al.
(Continued)

FOREIGN PATENT DOCUMENTS

| RU | 02195788 | 12/2002 |
|---|---|---|
| RU | 02199183 | 2/2003 |
| WO | 2005089249 | 9/2005 |

OTHER PUBLICATIONS

Notice of Allowance from Russian Application No. 2011152250, mailed Oct. 13, 2014, English and Russian versions, pp. 1-17.
(Continued)

*Primary Examiner* — Sujatha Sharma
(74) *Attorney, Agent, or Firm* — Meyertons, Hood, Kivlin, Kowert & Goetzel, P.C.

(57) ABSTRACT

A mobile station receives a control message containing an indicator of presence of a first access network that operates according to a first protocol that is capable of interworking with a second access network that operates according to a second, different protocol. In response to receiving the indicator, the mobile station performs a procedure to establish a personality for the mobile station that specifies the configuration to allow the mobile station to use features of the first access network that enable interworking with the second access network.

20 Claims, 3 Drawing Sheets

(56) References Cited

U.S. PATENT DOCUMENTS

| | | | |
|---|---|---|---|
| 7,046,998 | B2 | 5/2006 | Verma et al. |
| 7,089,008 | B1 | 8/2006 | Back et al. |
| 7,218,643 | B1 | 5/2007 | Saito et al. |
| 8,244,249 | B1 | 8/2012 | Everson et al. |
| 8,279,765 | B2 | 10/2012 | Sayeedi |
| 8,468,354 | B2 | 6/2013 | Zhang |
| 2005/0111394 | A1 | 5/2005 | Jung et al. |
| 2005/0153684 | A1 | 7/2005 | Rodrigo |
| 2006/0040661 | A1 | 2/2006 | Choi et al. |
| 2007/0224988 | A1 | 9/2007 | Shaheen |
| 2008/0318565 | A1 | 12/2008 | Stojanovski et al. |
| 2008/0318568 | A1 | 12/2008 | Zhang |
| 2009/0046596 | A1 | 2/2009 | Ewe et al. |
| 2009/0111468 | A1 | 4/2009 | Burgess et al. |
| 2011/0142006 | A1 | 6/2011 | Sachs |
| 2011/0182270 | A1 | 7/2011 | Shaheen et al. |
| 2011/0268084 | A1 | 11/2011 | Tanabe et al. |
| 2013/0194966 | A1 | 8/2013 | Wang et al. |
| 2013/0286941 | A1 | 10/2013 | Lee et al. |

OTHER PUBLICATIONS

U.S. Appl. No. 13/321,764, filed Nov. 21, 2011, Ke-Chi Jang.

Office Action from Japanese Patent Application No. 2012515086, mailed Apr. 30, 2014, English and Japanese versions, pp. 1-10.

International Search Report and Written Opinion dated Dec. 31, 2010 for International Application No. PCT/US2010/037875, International Filing Date: Jun. 9, 2010 consisting of 9 pages.

Office Action from Chinese Application No. 201080028397.5, mailed Dec. 10, 2014, Chinese and English versions, pp. 1-18.

Office Action from Japanese Application No. 2012515086, issued Nov. 25, 2014, English and Japanese versions, pp. 1-8.

"3rd Generation Partnership Project; Technical Specification Group Core Network and Terminals; 3gpp System to Wireless Local Area Network (WLAN) interworking; WLAN User Equipment (WLAN UE) to Network Protocols; Stage 3" 3GPP TS 24.234, Dec. 2008, pp. 1-38.

Notice of Allowance from Japanese Application No. 2012515086, issued Apr. 30, 2015, Japanese version, pp. 1-4.

Notice of Allowance, Korean Application No. 10-2011-7031510, mailed May 21, 2015, 2 pages.

ZTE, "Enhancements of eHRPD to E-Utran (WiMAX) Interworking Handoff", 3GPP2 Draft, C22-20090511-019-ZTE-EHRPD-LTE-HANDOFF, 3rd Generation Partnership Project 2, 3GPP2, 2500 Wilson Boulevard, Suite 300, Arlington, Virginia 22201, USA, vol. TSGC, May 12, 2009, 10 pages.

Jialin Zou, "Enhancement for HRPD to LTE Reselection and idle Traffic Redirection", 3GPP2 Draft, C22-20090330-017_037R1-ALU_HRPDTOLTE_RESELECTION, 3rd Generation Partnership Project 2, 3GPP2, 2500 Wilson Boulevard, Suite 300, Arlington, Virginia 22201, USA, vol. TSGC, Mar. 31, 2009, 9 pages.

Ke-Chi Jang, "Inter-Rat neighbor information", 3GPP2 Draft, C22-20090330-024_046_NT_HRPDTOLTE_NEIGHBOR_INFO, 3rd Generation Partnership Project 2, 3GPP2, 2500 Wilson Boulevard, Suite 300, Arlington, Virginia 22201, USA, vol. TSGC, Mar. 31, 2009, 8 pages.

Supplementary Search Report, European Application No. 10786731, mailed Jul. 20, 2015, 9 pages.

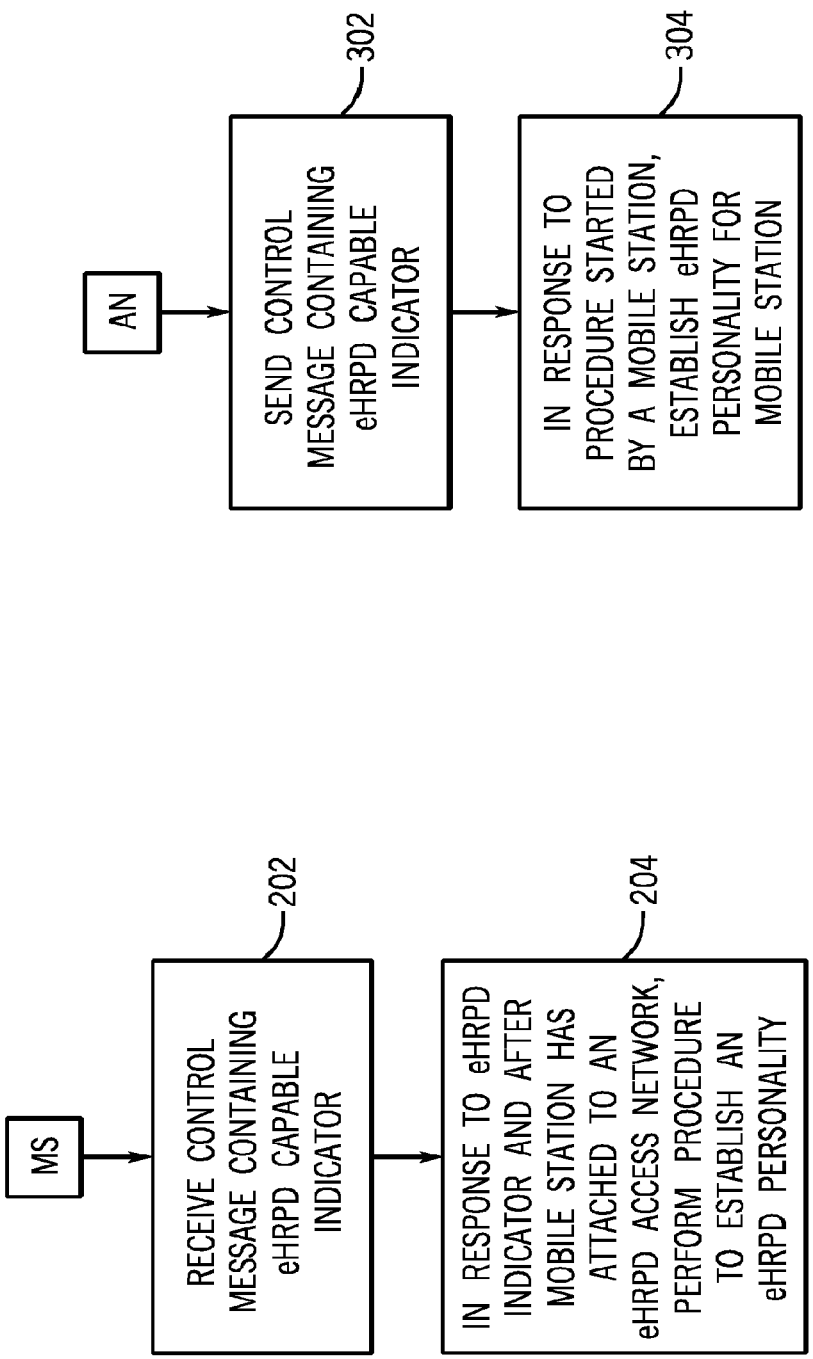

PROVIDING AN INDICATOR OF PRESENCE OF A FIRST ACCESS NETWORK THAT IS CAPABLE OF INTERWORKING WITH A SECOND ACCESS NETWORK

CROSS REFERENCE TO RELATED APPLICATIONS

This application is a continuation of U.S. patent application Ser. No. 13/321,764, filed Nov. 21, 2011, entitled "PROVIDING AN INDICATOR OF PRESENCE OF A FIRST ACCESS NETWORK THAT IS CAPABLE OF INTERWORKING WITH A SECOND ACCESS NETWORK," which is a Submission Under 35 U.S.C. §371 for U.S. National Stage Patent Application of International Application Number: PCT/US2010/037875, filed Jun. 9, 2010, entitled "PROVIDING AN INDICATOR OF PRESENCE OF A FIRST ACCESS NETWORK THAT IS CAPABLE OF INTERWORKING WITH A SECOND ACCESS NETWORK," which claims priority to U.S. Provisional Application Ser. No. 61/185,811, filed Jun. 10, 2009, the entirety of which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2. CDMA 2000 defines one type of packet-switched wireless access network, referred to as the HRPD (High Rate Packet Data) wireless access network.

Another more recent standard that provides packet-switched wireless access networks is the Long Term Evolution (LTE) standard from 3GPP, which seeks to enhance the UMTS technology. The LTE standard is also referred to as the EUTRA (Evolved Universal Terrestrial Radio Access) standard. The EUTRA technology is considered to be fourth generation (4G) technology, to which wireless network operators are migrating to provide enhanced services.

SUMMARY

In general, according to some embodiments, a method comprises receiving, by a mobile station a control message containing an indicator of presence of a first access network that operates according to a first protocol that is capable of interworking with a second access network that operates according to a second, different protocol. In response to receiving the indicator, the mobile station performs a procedure to establish a personality for the mobile station that specifies the configuration to allow the mobile station to use features of the first access network that enable interworking with the second access network.

Other or alternative features will become apparent from the following description, from the drawings, and from the claims.

BRIEF DESCRIPTION OF THE DRAWINGS

Some embodiments are described with respect to the following figures:

FIG. 2 is a flow diagram of a process performed by a mobile station, according to some embodiments;

FIG. 3 is a flow diagram of a process performed by a base station in a wireless access network, according to some embodiments.

DETAILED DESCRIPTION

Figure 1:
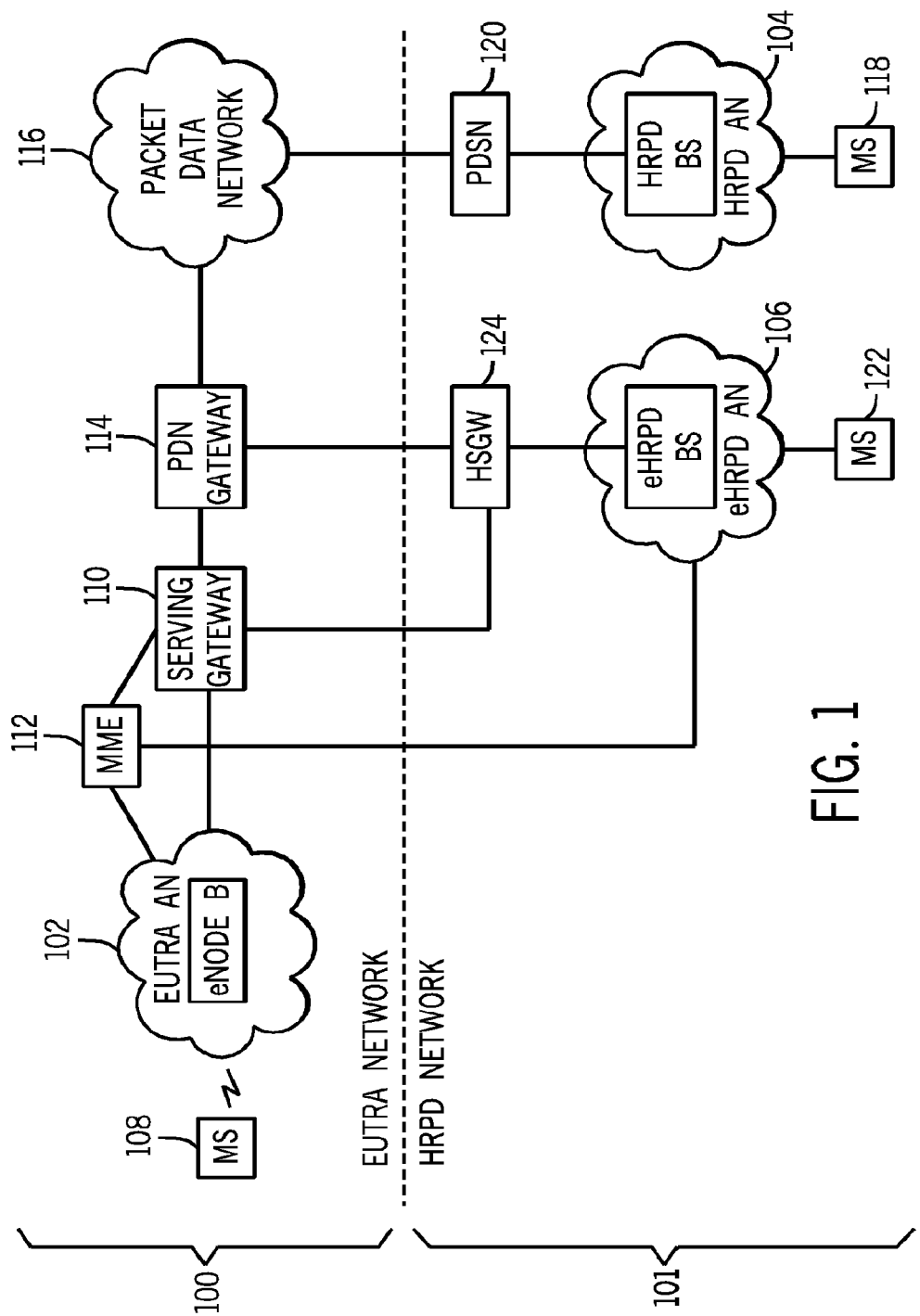
FIG. 1 is a block diagram of an example arrangement that includes different types of wireless access networks, in which some embodiments can be incorporated.

Wireless network operators are migrating to fourth generation (4G) wireless networks. One such type of 4G wireless network is the Long Term Evolution (LTE) wireless network, as defined by the Third Generation Partnership Project (3GPP). The LTE standard is also referred to as the EUTRA (Evolved Universal Terrestrial Radio Access) standard.

Migrating from CDMA (Code Division Multiple Access) 2000 technology, such as the HRPD (High Rate Packet Data) technology defined by 3GPP2, to EUTRA technology, involves various challenges. A technique to allow for migration from HRPD to EUTRA involves use of evolved HRPD (eHRPD) technology. An eHRPD wireless access network is capable of interworking with an EUTRA wireless access network. A mobile station that supports the eHRPD technology can be handed off between the eHRPD access network and an EUTRA access network. Additionally, a mobile station that supports eHRPD can perform cell re-selection on either EUTRA or eHRPD access networks. Different wireless protocols can use different types of modulations for wireless communications, such as OFDM (orthogonal frequency division multiplexing), GMSK (Gaussian minimum shift keying, 8PSK (8 phase-shift keying), or CDMA modulations.

A mobile communications system maintained by a wireless network provider may not implement eHRPD capability in all HRPD access networks. In other words, certain HRPD access networks in an HRPD coverage area are eHRPD enabled (these access networks are referred to as eHRPD access networks), while other HRPD access networks in the HRPD coverage area do not support eHRPD capability (these access networks are referred to as HRPD access networks). For example, it is possible that only those HRPD cells that overlap with an EUTRA coverage area or are adjacent to an EUTRA coverage area would employ eHRPD access networks.

When a mobile station transitions from an HRPD access network to an eHRPD access network, conventional mechanisms do not provide an efficient technique to initiate a session negotiation procedure to establish an eHRPD personality. For example, a mobile station can power up in a regular HRPD access network and later move into an eHRPD access network. An eHRPD personality includes a configuration to allow the mobile station to use features of the eHRPD access network that enable interworking with the EUTRA network. A personality includes protocol types (for identifying types of protocols to use) and attribute values (values of predefined attributes relevant for communications) used for communication between the mobile station and access network. An eHRPD personality includes the protocol types and attribute values associated with the eHRPD technology that enable the mobile station to use eHRPD features. Without an established eHRPD personality, the mobile station will be unable to use eHRPD features.

In accordance with some embodiments, mechanisms or techniques are provided to allow a mobile station that has eHRPD capability to efficiently determine when the mobile station is in an eHRPD access network. This can be accomplished by sending a control message to the mobile station, where the control message contains an indicator (or indicators) of one or more access networks that are eHRPD capable. The control message can be sent by an eHRPD access network to which the mobile station has transitioned. In this case, the indicator in the control message is an indicator that the eHRPD access network to which the mobile station has transitioned is eHRPD capable. Alternatively, the mobile station can be provided with information regarding which neighbors of an access network that the mobile station is currently in are eHRPD capable. In this latter case, the control message would contain multiple indicators regarding which neighbors of an access network that the mobile station is currently in are eHRPD capable.

Upon determining that the mobile station is in an access network that is eHRPD capable, the mobile station can perform an eHRPD personality negotiation to establish a specific eHRPD personality for the mobile station.

Although reference is made to HRPD, eHRPD, and EUTRA, it is noted that more generally, the mobile station can receive a control message containing an indicator of presence of a first access network that is capable of interworking with a second access network, where the first access network operates according to a first protocol, and the second access network operates according to a second, different protocol. In response to receiving the indicator, the mobile station performs a procedure to establish a personality for the mobile station that specifies a configuration to allow the mobile station to use features of the first access network that enable interworking with the second access network. Note that techniques according to some embodiments can be applied to other types of access networks, including, as examples, WiMAX (Worldwide Interoperability for Microwave Access as defined by IEEE 802.16), WiFi (as defined by IEEE 802.11), and other types of access networks.

FIG. 1 illustrates an example arrangement that includes different types of access networks, including an EUTRA access network 102, an HRPD access network 104, and an eHRPD access network 106. Although just one EUTRA access network 102, one HRPD access network 104, and one eHRPD access network 106 is depicted in FIG. 1, it is noted that typically there would be multiple EUTRA access networks, multiple HRPD access networks, and multiple eHRPD access networks. As used here, the term "access network" or "wireless access network" refers to equipment used to allow a mobile station to wirelessly connect through the access network for accessing services provided on a target network, such as a packet data network 116.

According to the EUTRA technology, the EUTRA access network 102 includes an enhanced node B (eNode B), which is a type of base station. The HRPD access network 104 includes an HRPD base station, and the eHRPD access network 106 includes an eHRPD base station. A base station can perform one or more of the following tasks: radio resource management, mobility management for managing mobility of mobile stations, routing of traffic, and so forth. Generally, the term "base station" can refer to a cellular network base station or access point used in any type of wireless network, or any type of wireless transmitter/receiver to communicate with mobile stations. The term "base station" can also encompass an associated controller, such as a base station controller or a radio network controller. It is contemplated that the term "base station" also refers to a femto base station or access point, a micro base station or access point, or a pico base station or access point. A "mobile station" can refer to a telephone handset, a portable computer, a personal digital assistant (PDA), or an embedded device such as a health monitor, attack alarm, and so forth.

As depicted in FIG. 1, in the EUTRA network 100, a mobile station 108 connects wirelessly to the EUTRA access network 102. The EUTRA access network 102 is in turn connected to various components, including a serving gateway 110 and a mobility management entity (MME) 112. The MME 112 is a control node for the EUTRA access network 102. For example, the MME 112 is responsible for idle mode mobile station tracking and paging procedures. The MME 112 is also responsible for choosing the serving gateway for a mobile station at initial attach and at time of handover. The MME 112 is also responsible for authenticating the user of the mobile station.

The serving gateway 110 routes bearer data packets. The serving gateway 110 also acts as a mobility anchor for the user plane during handovers between different access networks. The serving gateway 110 is also connected to a packet data network (PDN) gateway 114 that provides connectivity between the mobile station 108 and the packet data network 116 (e.g., the Internet, a network that provides various service, etc.).

In the HRPD network 101, a mobile station 118 connects wirelessly with the HRPD access network 104. The HRPD access network 104 is in turn connected to a packet data serving node (PDSN) 120, which in turn is connected to the packet data network 116.

Also, to allow for interworking between the HRPD network 101 and the EUTRA network 100, the eHRPD access network 106 is provided that wirelessly connects to a mobile station 122. The eHRPD access network 106 is in turn connected to an HRPD serving gateway (HSGW) 124. The HSGW 124 is the entity that terminates the eHRPD access network interface from the eHRPD access network 106. The HSGW 124 routes mobile station-originated or mobile station-terminated packet data traffic. The HSGW 124 provides interworking of the mobile station with the EUTRA network 100. The interworking functions include support for mobility, policy control and charging, access authentication, roaming, and others. The HSGW 124 supports seamless inter-technology mobility transfer between the EUTRA network 100 and the eHRPD access network 106.

Reference to the EUTRA, HRPD, and eHRPD standards is intended to refer to the current standards, as well as standards that evolve over time. It is expected that future standards evolve from EUTRA, HRPD, or eHRPD may be referred by different names. It is contemplated that reference to "EUTRA," "HRPD," or "eHRPD" is intended to cover such subsequently evolved standards as well. Also, as noted above, techniques or mechanisms are applicable for systems employing other types of wireless protocols.

FIG. 2 is a flow diagram of a process performed by a mobile station. The mobile station receives (at 202) a control message containing an eHRPD capable indicator for indicating that a particular access network, such as the eHRPD access network 106, is eHRPD capable. The control message received by the mobile station can be an overhead message that is broadcast by an access network over a control channel. One type of overhead message is the HRPD QuickConfig message. Another example overhead message is the SectorParameters message. A QuickConfig message is used to indicate a change in the content of an overhead message. A SectorParameters message is used to convey sector specific information to mobile stations. In other implementations, other types of control messages can be used for informing a mobile station that a particular access network is eHRPD capable. In addition, it is noted that instead of being a broadcast message, a control message containing the eHRPD capable indicator can be a message targeted to a specific mobile station.

Note that the control message can merely indicate whether or not the access network that the mobile station is currently attached is an eHRPD capable access network. Alternatively, the control message can indicate a set of access networks, including neighbor access networks that are eHRPD capable. In this latter scenario, multiple indicators would be provided in the control message to indicate which multiple access networks are eHRPD capable. In this way, when the mobile station switches to a new eHRPD access network 106, the mobile station knows that the new eHRPD access network 106 is eHRPD capable.

In response to the eHRPD indicator, and after the mobile station has attached to an eHRPD capable access network, the mobile station performs (at 204) a procedure to establish an eHRPD personality for the mobile station. In some examples, the procedure for establishing the eHRPD personality can be a session configuration procedure.

Once the eHRPD personality has been established for the mobile station, the mobile station is able to use features of the eHRPD capable access network (e.g., eHRPD access network 106) that enable interworking with the EUTRA network 100.

FIG. 3 is a flow diagram of a process performed by an access network, according to some embodiments. For example, the procedure of FIG. 3 can be performed by the eHRPD access network 106 of FIG. 1. The access network sends (at 302) a control message containing an eHRPD capable indicator, such as to indicate that an access network is capable of supporting eHRPD. Alternatively, the control message can contain multiple eHRPD capable indicators to specify respective access networks as being eHRPD capable. In response to a procedure started by the mobile station, the access network cooperates with the mobile station to establish (at 304) an eHRPD personality for the mobile station.

Figure 4:
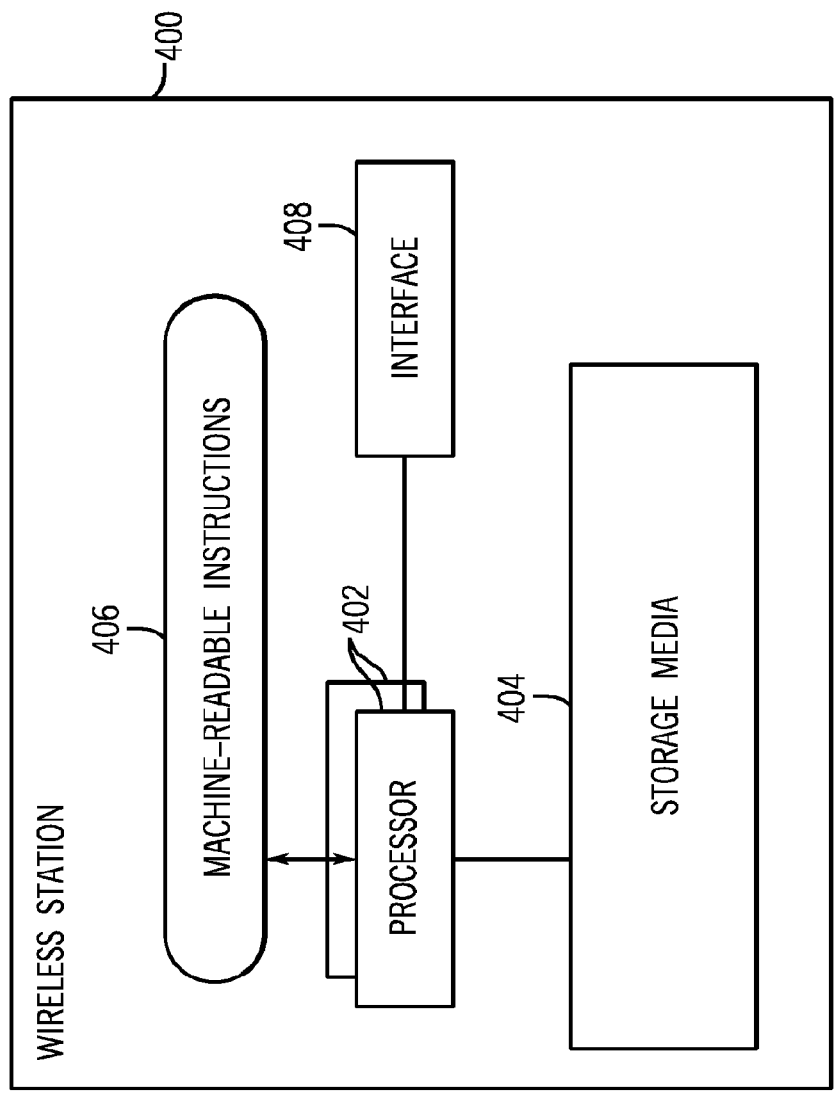
FIG. 4 is a block diagram of a wireless station according to some embodiments.

FIG. 4 is a block diagram of a wireless station 400, which can either be a mobile station (e.g., mobile station 108, 118, or 122 in FIG. 1) or a base station (e.g., eNodeB, HRPD base station, or eHRPD base station in FIG. 1). The wireless station 400 includes a processor (or multiple processors) 402, which is (are) connected to storage media 404. Machine readable instructions 406 are executable on the processor(s) 402 to perform respective tasks associated with the wireless station 400, such as tasks depicted in FIG. 2 or 3. The wireless station 400 also includes an interface 408 for communicating over a wireless link, such as a radio frequency (RF) link.

The machine-readable instructions 406 are loaded for execution on the processor(s) 402. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
by a mobile station,
receiving a control message containing an indicator of a first access network that is interoperable with a second access network, wherein the first access network has a first protocol, and the second access network has a second protocol; and
performing a procedure to establish a personality for the mobile station, in response to receiving the control message, wherein the personality specifies a configuration allowing the mobile station to use features of the first access network that enable interworking with the second access network, and wherein the performing the procedure comprises negotiating the personality for the mobile station.

2. The method of claim 1, further comprising:
transitioning, prior to receiving the control message, from a third access network to the first access network, wherein the third access network is not interoperable with the second access network.

3. The method of claim 1, wherein the control message further contains additional indicators of additional access networks that are interoperable with the second access network, wherein each of the additional access networks has the first protocol.

4. The method of claim 1, wherein receiving the control message comprises receiving a broadcast overhead message.

5. The method of claim 1, wherein the personality defines protocol types and associated attribute values used for communication between the mobile station and the first access network.

6. The method of claim 1, wherein the procedure to establish the personality comprises a session configuration procedure with the first access network.

7. A method comprising:
by a base station of an access network,
sending, to a mobile station, a control message containing an indicator of a first access network that is interoperable with a second access network, wherein the first access network has a first protocol, and the second access network has a second protocol; and
establishing a personality for the mobile station, wherein the personality specifies a configuration allowing the mobile station to use features of the first access network that enable interworking with the second access network, and wherein the establishing comprises negotiating the personality for the mobile station.

8. The method of claim 7, wherein the access network is the first access network.

9. The method of claim 7, further comprising the first access network cooperating with the mobile station to establish the personality.

10. The method of claim 7, wherein the access network is different from the first access network.

11. The method of claim 7, wherein sending the control message comprises broadcasting an overhead message.

12. The method of claim 7, wherein the personality defines protocol types and associated attribute values used for communication between the mobile station and the access network.

13. The method of claim 7, wherein establishing the personality comprises a session configuration procedure with the access network.

14. A mobile station, comprising:
an interface to a wireless link; and
at least one processor coupled to the interface and configured to:
receive a control message containing an indicator of a first access network that is interoperable with a second access network, wherein the first access network has a first protocol, and the second access network has a second protocol; and
perform a procedure to establish a personality for the mobile station, in response to receiving the control message, wherein the personality specifies a configuration allowing the mobile station to use features of the first access network that enable interworking with the second access network, and wherein to perform the procedure, the at least one processor is further configured to negotiate the personality for the mobile station.

15. The mobile station of claim 14, wherein the at least one processor is further configured to:
transition, prior to receiving the control message, from a third access network to the first access network, wherein the third access network is not interoperable with the second access network.

16. The mobile station of claim 14, wherein the control message further contains additional indicators of additional access networks that are interoperable with the second access network, wherein each of the additional access networks has the first protocol.

17. The mobile station of claim 14, wherein the control message is a broadcast overhead message.

18. The mobile station of claim 14, wherein the personality defines protocol types and associated attribute values used for communication between the mobile station and the first access network.

19. The mobile station of claim 14, wherein to perform the procedure, the at least one processor is further configured to:
cooperate with the first access network to establish the personality.

20. The mobile station of claim 14, wherein the procedure to establish the personality comprises a session configuration procedure with the first access network.

* * * * *